Patented Oct. 25, 1932

1,884,773

UNITED STATES PATENT OFFICE

BORIS N. LOUGOVOY, OF NEW YORK, N. Y., ASSIGNOR TO CHADELOID CHEMICAL COMPANY, OF NEW YORK, N. Y., A CORPORATION OF WEST VIRGINIA

NONBENZOLIC FINISH REMOVER CONTAINING CHLORINATED HYDROCARBONS

No Drawing.   Application filed December 13, 1928.   Serial No. 325,933.

This invention relates to a finish remover free or substantially free from benzol, and hence non-benzolic, and particularly refers to a paint and varnish removing composition containing chlorinated hydrocarbons in admixture with loosening solvents, such as alcoholic, ketonic or esteric solvents, with a few per cent of evaporation retarding material namely a wax, these solvents being so balanced as to produce a composition of the highest possible efficiency, designed primarily for use in cases where there is no need for a very slow rate of evaporation.

Finish removing compositions which are widely used at the present time are in certain cases composed of benzol as a wax solvent with acetone, or alcohol and acetone, as loosening solvents, which latter also serve as wax precipitants.

In making any paint removing composition of general utility, two essential conditions should be fulfilled, that is, (1) the requirement of speedy action, i. e., the efficiency of the removing composition, and (2), the requirement of a low rate of evaporation, i. e., the property of a paint removing mixture to remain wet for a considerable time after application to the old paint.

It is often very difficult to simultaneously satisfy both of these fundamental requirements to the extent desired, because of the necessity not only of the proper balance of the solvents in regard to their solvent power, but also the necessity of the desired physical constants of these solvents. Oftentimes compositions meeting one of these requirements, say, the proper rate of evaporation, may at the same time be deficient in the other basic requirement, say, the desired high activity of the removing mixture.

The requirement regarding low rate of evaporation becomes an especially important one in cases where a remover is used under extreme service conditions to soften an old thick coat of paint, and to accomplish this in a warm place. In such cases, in order to produce an efficient action, the remover should be capable of remaining wet for a long period of time in order that these solvents may have enough time to exercise their solvent action upon the dried paint.

On the other hand in many practical applications the finish to be removed does not require extremely long contact with the remover in order to be sufficiently softened. Such are the cases of comparatively thin coatings or coatings of relatively fresh paint. Here the requirement of low rate of evaporation for a remover becomes a secondary factor and it would be to the advantage to sacrifice the rate of evaporation to a reasonable extent if a more efficient (i. e., quick acting) removing mixture could be produced. It is with special reference to such cases as this, that the present invention is particularly directed, and I aim in the present case to secure great rapidity of action, for quick work, even if the rate of evaporation is rather high.

Benzol, while not a good solvent for dried coatings of paint or varnish when used alone, cooperates with loosening solvents such as alcoholic or ketonic solvents, to produce a good removing mixture, and therefore has been considered a desirable ingredient of paint and varnish removers. However, the use of benzol has been criticized because of its possible injurious action on the health of the workmen, or other persons who may inhale air containing benzol vapors.

Since paint and varnish removing compositions are used extensively on inside work, it is the object of my invention to substitute for the benzol some other materials which will give a mixture used as the remover, exhibiting an activity at least equal to or higher than the activity of benzol-containing paint and varnish remover.

The use of benzol in paint and varnish removers serves a double purpose: Its main rôle is a wax carrier. Secondly, it provides penetrating power. It is commonly referred to in the prior art as a "penetrating solvent".

As is known, wax is generally used to retard evaporation of the solvent mixture. Brought into suspension in a semi-colloidal state, wax is capable of producing a surface-film which acts as a retarder of evaporation. In order to bring the wax to such a state it may, for example, be dissolved in some wax solvent and then be precipitated from the solution with another finish solvent, which is miscible with the wax solvent but which by itself is not a solvent for the wax. Alcohols, ketones, esters and many other organic solvents can be used for such purpose.

As a wax solvent many other substances can be used in place of benzol. They include hydrocarbons both of the aliphatic and aromatic series as well as substituted hydrocarbons, such as chlorinated hydrocarbons. While apparently there is the possibility of a considerable choice of various solvents to replace benzol, the question is not so simple when the practical requirements for a cheap but active remover are taken into consideration. Many liquids while being good wax solvents, such as petroleum hydrocarbons, do not cooperate, as does benzol, with the other solvents in providing satisfactory removing action. Contrary to benzol, when mixed with other solvents, they decrease the efficiency. In addition, wax solvents of the nature of petroleum hydrocarbons oftentimes present another difficulty in paint and varnish removers; that is, the very poor miscibility with other solvents, such as alcohols or ketones, especially in the presence of wax.

Higher homologues of benzol, such as toluol or xylol, are good solvents for wax and they also possess the penetrating property of benzol to a considerable degree, but they have the disadvantage as compared with benzol of being far less volatile, and (when used with finish loosening solvents which are more volatile than benzol or not much less volatile than benzol) of increasing the rate of evaporation of removers. This is especially noticeable when used in conjunction with such desirable low-boiling loosening solvents as acetone (methyl methyl ketone), methyl acetate or methyl alcohol. Chlorinated hydrocarbons, such as trichlorethylene, acethylene tetrachloride, monochlorobenzol, and the like, are also good wax solvents and by themselves have some removing action on paint. However, certain chlorinated hydrocarbons, as for example, carbon tetrachloride, are not very desirable as ingredients in paint and varnish removers because they are apt to develop free acid. Chlorinated hydrocarbons, such as trichlorethylene or chlorobenzol, present the same difficulty as high-boiling benzolic hydrocarbons (toluol, xylol), that is, they usually increase the rate of evaporation of the remover solvents beyond any possibility of extensive practical application, for cases where long contact of the remover and painted surface is necessary.

It should be noted that the rate of evaporation of a paint and varnish removing mixture depends on several factors. First of all, for a given mixture of solvents, the rate of evaporation, is (roughly) inversely proportional to the amount of wax or other evaporation-retarding material introduced into the remover. The proportion of such evaporation-retarding material is necessarily limited.

While the wax or other evaporation-retarding material is an important fundamental ingredient of the paint and varnish removing composition, it is not the only one which when utilized produces a satisfactory result. For example, a mixture of solvents can be produced which will not have a low rate of evaporation even with a very large amount of wax, exceeding all permissible limits.

In order to obtain a slow-evaporating mixture I may employ a mixture in which the wax solvent or solvents are more volatile than the wax precipitants. This proposal holds true for all kinds of wax solvents above mentioned and is particularly noticeable with hydrocarbon solvents, both of the aliphatic and aromatic groups.

For example, taking a mixture of

| | Parts |
|---|---|
| Wax solvent (see below) | 50 |
| Anhydrous methanol | 25 |
| Anhydrous acetone | 25 |
| Paraffin wax | 2 | the rate of evaporation in two hours will be as follows:

With benzol (b. p. 80° C.) as the wax solvent,

| | Per cent |
|---|---|
| Loss in weight in two hours, about | 1 |

With toluol (b. p. 111° C.) as the wax solvent,

| | |
|---|---|
| Corresponding loss in weight in two hours | 20 |

With xylol (b. p. 142° C.) as the wax solvent,

| | |
|---|---|
| Corresponding loss in weight in two hours, over | 37 |

With a similar mixture, but using petroleum hydrocarbons as wax solvents, the rate of evaporation was found to be as follows:

With petroleum ether (b. p. 40–60° C.) as the wax solvent,

| | Per cent |
|---|---|
| Loss in weight in two hours less than | 2 |

With petroleum distillate (b. p. range 60–85° C.) as the wax solvent

| | |
|---|---|
| Corresponding loss in weight | 45 |

With petroleum distillate (b. p. range 60–115° C.) as the wax solvent

Corresponding loss in weight _____ Per cent 50

With trichlorethylene (b. p. 87° C.) as the wax solvent

Loss in weight in 2 hours _____ 22

With monochlorobenzol (b. p. 132° C.) as the wax solvent

Loss in weight in 2 hours _____ 26

I have also observed that removers containing chlorinated hydrocarbons as the wax solvents, while following in general the above characterization have the advantage of giving a relatively smaller loss by evaporation than petroleum hydrocarbons of approximately the same boiling point range. Taking into consideration that chlorinated hydrocarbons, particularly trichlorethylene and chlorobenzol, are somewhat better paint solvents than benzol they would present desirable materials as a substitute for benzol provided the rate of evaporation of a corresponding remover containing these hydrocarbons could be made sufficiently low.

As already mentioned, in many cases of practical use of removers, it is more desirable to have a quick-acting remover even at the expense of a somewhat higher rate of evaporation. As a rule loosening solvents (wax precipitants) of high volatility, such as acetone, methyl acetate, and the like, possess high solvent power on dried paint and therefore would be desirable ingredients in conjunction with such wax solvents as chlorobenzol or trichlorethylene, provided evaporation could be retarded for a sufficient length of time to allow these vigorous solvents to act upon the coating. In such cases the only requirement regarding rate of evaporation would be that the removing mixture does not dry out before the complete softening of the paint is accomplished, which result should be secured, let us say, within 15-20 minutes from the moment of the application of the remover.

I have found that mixtures of chlorinated hydrocarbons with acetone and methyl acetate produce very effective removers, but they are not suitable in cases where a really slow rate of evaporation is required. However, the rate of evaporation of these mixtures, as will be seen from the examples below, may be considered within an allowable limit for the purpose of the present invention if very high activity is taken into consideration.

The rate of evaporation of the paint and varnish remover was determined in all cases mentioned herein by placing a remover to a depth of 7 m. m. into a low tin dish of about 70 m. m. in diameter in approximately the same proportions (about 20 grams) and placing such dish into a warm ventilated oven where an even temperature of about 75° F. is maintained. The sample was weighed at regular intervals to determine the losses which are expressed in per cent of the original weight of sample.

The rate of evaporation (in a remover for general application) may be regarded eminently satisfactory if the loss in weight under the conditions of the tests just described does not exceed 5-6% in twenty-four hours. For a quick-acting remover, which, as already indicated, "cuts through to the wood" in 15-20 minutes when applied to thin or relatively non-resistant coatings, such a slow rate of evaporation is not needed and it will not be objectionable if the loss in weight on exposure reaches even fifteen to twenty per cent in two hours.

The determination of the rate of evaporation of various paint and varnish removing compositions show that roughly for a given mixture of solvents and a given wax-content, the rate of evaporation is proportional to the time of exposure at a given temperature and a given depth of layer. Consequently, for a remover which shows about 25% loss in two hours, the loss in 20 minutes will be perhaps 5% or so, of the weight of the remover, a proportion which is within practically possible limits under the operating conditions specified.

To determine the removing power or cutting efficiency of the mixtures two methods have been used. One method was applied to pure solvents or to their mixtures, which did not contain wax, and consisted in placing such solvent in a test tube, immersing in that solvent a strip of painted wood and noting the time by means of a stop watch when the wrinkling or blistering of the paint appeared. This tests the activity of the solvents only (i. e. without the wax).

The results of such observations are given in the following table.

*Paint and varnish remover solvents containing chlorinated hydrocarbons*

| | Cutting power seconds |
|---|---|
| Benzol | 3600 |
| Monochlorobenzol | 400 |
| Petroleum naphtha | No action |
| Trichlorethylene | 360 |
| Anhydrous methanol | 240 |
| Acetone | 80 |
| "Lugosol" | 45 |
| Methyl ethyl ketone | 75 |
| "Methyl cellosolve" (methyl ether of ethylene glycol) mixtures (equal parts by volume) | 90 |
| Benzol and anhydrous methanol | 45 |
| Trichlorethylene and methanol | 30 |
| Monochlorobenzol and methanol | 15 |
| Petroleum naphtha and methanol | 260 |
| Benzol and acetone | 65 |
| Trichlorethylene and acetone | 35 |
| Monochlorobenzol and acetone | 35 |
| Petroleum naphtha and acetone | 280 |

| | Cutting power seconds |
|---|---|
| Benzol and "methyl cellosolve" | 70 |
| Trichlorethylene and "methyl cellosolve" | 40 |
| Monochlorobenzol and "methyl cellosolve" | 35 |
| Benzol, acetone and methanol | 50 |
| Trichlorethylene, acetone and methanol | 25 |
| Monochlorobenzol, acetone and methanol | 15 |
| Petroleum naphtha, acetone and methanol | 155 |

Another method which was used for testing the activity of the completed paint and varnish removers (i. e., the above solvents with wax) was as follows: A panel from an automobile was chosen as the testing surface. Approximately equal amounts of each remover were placed on this panel and the time was noted by means of a stop watch for the appearance of about the same degree of wrinkling.

Below are given various samples of paint and varnish removing compositions made in accordance with the present invention giving in each case information relating to the rate of evaporation and the removing power.

It is understood that the proportions and components given in these examples should be regarded only as illustrations and that I do not wish to restrict myself to these proportions, which may be modified according to requirements. All proportions are given by volume, including wax, which was estimated in the molten state. Removing power was determined on a panel from an automobile as described above.

Example 1

| | Parts |
|---|---|
| Trichlorethylene | 40 |
| Acetone | 30 |
| Methyl acetate | 20 |
| Paraffin wax | 2 |

Loss in weight in 2 hrs_____ 22 per cent
Removing rate _____ 90 seconds

This remover represents a type of the quick action removers. It is over one and a half times as active as benzol, acetone and methyl alcohol remover which, under the condition of the test and with the same proportion of wax, exhibits a removing rate of about 140 seconds. This benzol-acetone-methanol remover is and always has been regarded as extremely rapid.

Example 2

| | Parts |
|---|---|
| Trichlorethylene | 50 |
| Anhydrous methanol | 25 |
| Methyl acetate | 25 |
| Paraffin wax | 2 |

Loss in weight in 2 hrs_____ 5 per cent
Removing rate_____ 72 seconds

This remover is about twice as active as a remover of similar formula in which benzol is used as a wax solvent in place of trichlorethylene. Such a remover under above test gave removing rate of 145 seconds.

Example 3

| | Parts |
|---|---|
| Monochlorobenzol | 50 |
| Anhydrous methanol | 25 |
| "Lugosol" | 25 |
| Paraffin | 3 |

Loss in weight in 2 hrs_____ 1 per cent
Removing rate_____ 120 seconds

Example 4

| | Parts |
|---|---|
| Monochlorobenzol | 40 |
| Anhydrous methanol | 20 |
| Acetone | 20 |
| Furfural | 20 |
| Paraffin | 2 |

Loss in weight in 2 hrs_____ 0.5 per cent
Removing rate_____ 55 seconds

As described in my copending case Ser. No. 280,955 filed May 26, 1928, to ordinary commercial acetone, preferably first carefully neutralized there is added a small amount, say 0.02 to 0.03% of a fixed alkali hydroxid such as NaOH or KOH, then the mass well mixed and allowed to stand for 16 hours or longer (a few days if desired) at about room temperature, then the alkali carefully neutralized (preferably with an acid which will unite with the alkali used to form a salt insoluble in the mixture). Then the resulting liquid is fractionally redistilled, and a product distilling over between about 60 and 170° C., is separately collected. This latter is termed "Lugosol" and said term is used herein in that sense. The alkali produces more or less polymerization, and the "Lugosol" is a mixture of several different materials.

The term "total solvents present" or "remover solvents" is intended to cover all of the liquid constituents of the remover which "singly or collectively" have a solvent or softening action on the old finish coatings.

What I claim is:

1. A non-benzolic, quick-acting finish remover containing as its essential wax solvent, chlorinated hydrocarbons of lower volatility than benzol, wax, and wax precipitants constituted in major part at least by a plurality of substances selected from the herein described group consisting of methanol, methyl acetate, acetone and "Lugosol", such remover having higher activity than the corresponding benzol-containing remover, and containing wax precipitant in excess over wax solvent.

2. A non-benzolic finish remover comprising wax, trichlorethylene as its essential wax solvent, and wax precipitants the major part at least of which are selected from the group consisting of methyl alcohol, acetone, methyl acetate and "Lugosol", the amount of such wax precipitants being at least as great as the amount of said wax solvent.

3. A non-benzolic finish remover comprising wax, trichlorethylene as its essential wax solvent, and wax precipitants the major part at least of which are selected from the group consisting of methyl alcohol, acetone, methyl acetate and "Lugosol", the amount of such wax precipitants being substantially greater than the amount of said wax solvent.

4. A non-benzolic finish remover comprising wax, monochlorobenzol as its essential wax solvent, and wax precipitants the major part at least of which are selected from the group consisting of methyl alcohol, acetone, methyl acetate and "Lugosol", the amount of such wax precipitants being at least as great as the amount of said wax solvent.

5. A non-benzolic high speed finish remover containing a wax and having as its essential wax solvent, a chlorinated hydrocarbon selected from the herein described group consisting of monochlorobenzol and trichlorethylene, and having wax precipitants selected in major part at least from the herein described group consisting of acetone, "Lugosol", methyl ethyl ketone and methanol, the chlorinated hydrocarbon being about 40 to 50% of the total solvents present including wax solvents and wax precipitants, and the amount of wax precipitants being not substantially below 50% of the total solvents present.

6. A non-benzolic high speed finish remover containing a wax and having as its essential wax solvent, a chlorinated hydrocarbon selected from the herein described group consisting of monochlorobenzol and trichlorethylene, and having wax precipitants selected in major part at least from the herein described group consisting of acetone, "Lugosol", methyl ethyl ketone and methanol, the chlorinated hydrocarbon being about 40 to 50% of the total solvents present including wax solvents and wax precipitants, and said remover containing a minor proportion of a wax precipitant of lower volatility selected from the herein described group consisting of "methyl cellosolve" and furfural, the amount of the total wax precipitants being not substantially below 50% of the total solvents present.

In testimony whereof I affix my signature.

BORIS N. LOUGOVOY.